(12) United States Patent
Baron et al.

(10) Patent No.: US 7,157,003 B2
(45) Date of Patent: Jan. 2, 2007

(54) CYCLIC METHOD FOR SEPARATING CHEMICAL ELEMENTS PRESENT IN AN AQUEOUS SOLUTION

(75) Inventors: Pascal Baron, Bagnols sur Ceze (FR); Michael Lecomte, Avignon (FR); Xavier Heres, Avignon (FR); Bernard Mauborgne, Equeurdreville Hanneville (FR)

(73) Assignee: Commissariat A L'Energie Atomique, Paris (FR)

( * ) Notice: Subject to any disclaimer, the term of this patent is extended or adjusted under 35 U.S.C. 154(b) by 246 days.

(21) Appl. No.: 10/679,462

(22) Filed: Oct. 7, 2003

(65) Prior Publication Data
US 2004/0124141 A1    Jul. 1, 2004

(30) Foreign Application Priority Data
Oct. 15, 2002    (FR)    .................................. 02 12795

(51) Int. Cl.
*B01D 11/00* (2006.01)
(52) U.S. Cl. ........................ 210/639; 203/39; 210/774; 210/806; 423/8; 423/21.5
(58) Field of Classification Search ............... 210/634, 210/638, 639, 682, 774, 806, 808; 203/39; 423/8, 21.5; 588/20
See application file for complete search history.

(56) References Cited

U.S. PATENT DOCUMENTS

| 2,572,128 | A | * | 10/1951 | Fortess et al. ............... 562/606 |
| 2,897,046 | A | * | 7/1959 | Bohlmann .................... 423/10 |
| 3,745,205 | A | * | 7/1973 | Peppard et al. ............... 423/10 |
| 4,496,523 | A |   | 1/1985 | Bonnin et al. |
| 4,548,790 | A | * | 10/1985 | Horwitz et al. ................ 423/9 |
| 4,595,529 | A | * | 6/1986 | Neace ........................ 252/364 |
| 4,867,951 | A |   | 9/1989 | Smith et al. |
| 5,523,515 | A | * | 6/1996 | Nemoto et al. ............... 588/20 |

FOREIGN PATENT DOCUMENTS

| FR | 1 534 888 | 6/1968 |
| FR | 2 509 282 | 1/1983 |

OTHER PUBLICATIONS

L. N. Kenneth, Solvent Extraction and Ion Exchange, vol. 11, No. 4, pp. 729-768, XP-002093868, "A Review of the Basic Chemistry and Recent Developments in Trivalent f-Elements Separations", 1993.

(Continued)

*Primary Examiner*—Joseph Drodge
(74) *Attorney, Agent, or Firm*—Oblon, Spivak, McClelland, Maier & Neustadt, P.C.

(57) ABSTRACT

The invention concerns a cyclic method for separating at least one chemical element E1 from at least one chemical element E2 from an aqueous solution containing said elements, which employs a mixture of two extractants operating in non-overlapping chemical fields.

Each cycle of said method comprises: a) co-extracting elements E1 and E2 by means of an organic phase containing a first extractant suited to causing the migration of said elements into said organic phase; b) adding to the organic phase a second extractant suited to selectively retaining the element(s) E2 in said organic phase during step c): c) selectively stripping the element(s) E1 from the organic phase; d) selectively stripping the element(s) E2 from the organic phase; e) separating the first and second extractants present in said organic phase at the end of step d).

25 Claims, 2 Drawing Sheets

OTHER PUBLICATIONS

P. Baron, et al., Proceedings of the International Conference on Back-End of the Fuel Cycle: From Research to Solutions, GLOBAL '01, pp. 1-8, "Separation of the Minor Actinides: The Diamex-Sanex Concept", Sep. 9 and 13, 2001.

P. S. Dhami, et al., Separation Science and Technology, vol. 36, No. 2, pp. 325-335, "Studies on the Partitioning of Actinides from High Level Waste Using a Mixture of HDEHP and CMPO as Extractant", 2001.

* cited by examiner

CYCLIC METHOD FOR SEPARATING CHEMICAL ELEMENTS PRESENT IN AN AQUEOUS SOLUTION

TECHNICAL FIELD

The invention concerns a cyclic method that makes it possible to separate different chemical elements from each other from an aqueous solution containing said elements, by means of a mixture of at least two extractants operating in non-overlapping chemical fields.

The term "chemical element" is herein taken to mean any chemical element listed in the periodic table of elements (or the MENDELEIEV table), wherein said element may be in the free form or in the form of a salt, for example a nitrate.

The method according to the invention is based on the use of the liquid—liquid extraction technique, which uses the different relative solubility of the chemical elements that one wishes to separate in two non-miscible liquids, one of which is an aqueous solution (aqueous phase) and the other an organic liquid (organic phase), in order to obtain the transfer from one liquid to the other.

This method is suitable for use not just for separating two distinct groups of chemical elements but also for separating two chemical elements belonging to the same group.

Consequently, it may in particular find application in the field of spent nuclear fuel reprocessing and, in particular, in separating the minor actinides from the lanthanides present in the aqueous effluents produced during said reprocessing.

It may also find application in the field of processing rare earth ores, of thorium and/or uranium, or in the environmental field, for example the clean up of heavy metals or any other undesirable chemical elements from water.

STATE OF THE PRIOR ART

In order to separate the minor actinides (americium and curium) from the lanthanides present in the trivalent state in a PUREX raffinate, two methods have been proposed up to the present that use a mixture of two extractants operating in non-overlapping chemical fields.

Said methods schematically consist in co-extracting said actinides and said lanthanides by making them migrate jointly from said raffinate towards an organic phase containing the mixture of two extractants, then successively stripping from said organic phase the actinides and the lanthanides by means of selective aqueous complexing agents.

In said methods, all of the operations are designed to be carried out in a single cycle of liquid—liquid extractions.

They have been described respectively by P. Baron et al. in *Proceedings of the International Conference on Back-End of the Fuel Cycle: From Research to Solutions*, GLO-BAL'01, Paris, France, Sep. 9–13, 2001, published by INIS-FR-1108) [1], and by P. S. Dhami et al. in *Separation Science & Technology*, 36 (2), 325–335, 2001 [2].

In both cases, the mixture of two extractants comprises a malonamide [1] or carbamoylphosphine oxide [2] type solvating extractant, which is suited to jointly extracting the actinides and the lanthanides from an aqueous phase of high nitric acidity, and an acid extractant such as bis-(2-ethyl-hexyl) phosphoric acid [1-2], which, for its part, is suited to extracting lanthanides from an aqueous phase of low nitric acidity.

Indeed, said second extractant comes into play during the selective actinide stripping operation that follows said co-extraction operation, since it then enables the lanthanides to be retained in the organic phase and, consequently, to avoid the lanthanides being stripped at the same time as the actinides.

In order to limit the volume of solvents consumed as well as the volume of effluents produced and, consequently, bring down the operating cost of said methods, it is essential that, at the end of the lanthanide stripping operation, the organic phase that contains the two extractants may be recycled, in other words re-used in a new cycle for separating actinides and lanthanides.

This accounts for the fact that, in the above-mentioned methods, the two extractants are provided to be mixed with each other during the complete cycle even although each of them is only really useful during one phase of said cycle.

However, it turns out that the presence of the acid extractant in the organic phase during the actinide and lanthanide co-extraction operation has two major disadvantages.

In fact, it leads to undesirable elements such as molybdenum, zirconium or iron being co-extracted with the actinides, which imposes additional subsequent extraction operations in order, firstly, to separate said elements from the actinides and thus obtain said actinides with a satisfactory level of purity and, secondly, to remove said elements from the organic phase before said organic phase is recycled.

Moreover, it diminishes the extracting power of the solvating extractant vis-à-vis the actinides, due to the antagonism that exists between the two extractants. However, it would be desirable to be able to extract the minor actinides—which are highly radiotoxic and have a very long half—life with the highest possible yield, in order to reduce as much as possible the activity of nuclear waste destined for vitrification.

DESCRIPTION OF THE INVENTION

The precise aim of the present invention is a cyclic method for separating at least one chemical element E1 from at least one chemical element E2 present in a same aqueous solution, which employs a mixture of at least two extractants operating in non-overlapping chemical fields and which allows said disadvantages to be overcome.

According to the invention, each cycle of the method comprises the following steps:

a) co-extracting from an aqueous solution the elements E1 and E2 by bringing said solution into contact with a liquid organic phase containing a first extractant in an organic diluent, said first extractant being suited to causing the migration of said elements into said organic phase;

b) adding to the organic phase a second extractant suited to selectively retaining the element(s) E2 in said organic phase during step c);

c) selectively stripping the element(s) E1 from the organic phase, by bringing said organic phase into contact with an aqueous solution suited to causing the migration of said element(s) from said organic phase towards said solution;

d) selectively stripping the element(s) E2 from the organic phase, by bringing said organic phase into contact with an aqueous solution suited to causing the migration of said element(s) from said organic phase towards said solution; and e) separating the first and second extractants present in said organic phase at the end of step d) from each other with a view to using them again in the following cycle.

Consequently, the method according to the invention provides for separating the two extractants present in the organic phase at the end of each cycle from each other in such a way that, in the subsequent cycle, the second extractant is only added to the organic phase when this is strictly necessary, in other words to carry out the stripping of the element(s) E1.

According to the invention, the separation of the two extractants may be achieved by any technique that allows two organic compounds present in a same liquid phase to be separated from each other, the technique used being chosen as a function of the physical and chemical properties of each of said extractants.

Thus, by way of example, in the case where one of the two extractants is an acid, whereas the other has a basic nature, their separation may be achieved by aqueous solubilisation of one of said two extractants. The aqueous solubilisation of the acid extractant may, for example, be achieved by bringing the organic phase into contact with an aqueous solution of pH higher than 3, containing a sodium carbonate, ammonium carbonate, sodium hydroxide, hydrazine base or ammonium hydroxide type strong base and, if necessary, a weak hydrophilic acid such as a carboxylic acid, a hydrocarboxylic acid, a polaminocarboxylic acid, a phosphonic acid, a phosphinic acid, a thiophosphorous acid, a thiophosphonic acid, a thiophosphinic acid or even a sulphonic acid.

The aqueous solubilisation of the basic extractant may, for its part, be achieved by bringing the organic phase into contact with an aqueous solution of a relatively concentrated strong acid, for example 0.1 M.

The separation of the two extractants may also be achieved by distillation of the extractant with the lowest vaporisation point, if said extractants have sufficiently different vaporisation points, or by cryogenic solidification of the extractant with the highest solidification point, if said extractants have sufficiently different solidification points.

It may also be achieved by demixing, in other words inducing the formation of two non-miscible organic phases, each one strongly enriched in one of said two extractants.

Said demixing may, in particular, be achieved by bringing the organic phase into contact with an aqueous phase, either very acid such as an aqueous solution of nitric acid of molarity of at least 4, or very charged in cations, for example in sodium, lithium, iron, zirconium, palladium, molybdenum cations or in lanthanides.

According to a preferred embodiment of the method of the invention, the first and second extractants are separated from each other by an operation leading to the removal of the second extractant from the organic phase and maintaining the first extractant in said phase.

Indeed, in so far as the organic phase also comprises an organic diluent and said diluent and the first extractant are both used from the first step of a cycle, it is preferable that they remain associated with each other from the start to the end of said cycle. This makes it much easier to deal with the diluent, compared to a separation of two extractants which would lead to maintaining the second extractant in the organic phase and would require the second extractant to be separated subsequently from the diluent and to recover said diluent so that the first extractant could be re-dissolved in it.

The selective removal of the second extractant from the organic phase may, in particular, be achieved by an aqueous solubilisation, distillation or cryogenic solidification operation of said second extractant.

According to a first advantageous variant of this embodiment, the organic phase is subjected, after removal of the second extractant, to a purification treatment.

Said treatment, which is intended to eliminate, from the organic phase, the impurities and the degradation products that have built up in it during the previous steps, must not impoverish said phase in first extractant, or only do so to a very limited extent.

Consequently, it consists, for example, in scrubbing the organic phase with one or several aqueous solutions containing agents suited to selectively complexing said impurities and said degradation products, and thus allowing their transfer into said solutions, without however stripping the first extractant.

It may also comprise an operation of filtering the organic phase in the case where said phase comprises a precipitate that has been formed during the cycle.

According to a second advantageous variant of said embodiment, the second extractant is back-extracted in a fraction of the organic phase purified by bringing said fraction into contact with an aqueous solution of said extractant, which makes it possible to conserve an organic phase of constant composition and volume from one cycle to the next.

In accordance with the invention, the first and second extractants may be chosen from among solvating extractants, anion exchange extractants, also called basic extractants, and cation exchange extractants, also called acid extractants.

By way of examples of solvating extractants, one may cite tri-n-butylphosphate, malonamides such as dimethyl-dibutyltetradecylmalonamide (DMDBTDMA) or dimethyl-dioctylhexylethoxymalonamide (DMDOHEMA), trialkylphosphine oxides such as trioctylphosphine oxide (TOPO) and tributylphosphine oxide (TBPO), carbamoylphosphine oxides such as diisobutylphenyloctylcarbamoylmethylphosphine (CMPO), tri-isobutylphosphine sulphides, carbamoylphosphonates, dialkylsulphides such as dodecyl-methylsulphide and dihexylsulphide, substituted pyridines such as bis-triazinyl-1,2,4-pyridines (BTP) and 2,2'-dibenzimidazoles.

By way of example of anion exchange extractants, one may cite quaternary ammoniums, secondary amines, tertiary amines and trialkylguanidines, whereas cation exchange extractants are, for example, chosen from among carboxylic acids, phosphoric acids such as bis-(2-ethylhexyl)phosphoric acid (HDEHP), bis-(1,3-dimethyl-dibutyl)phosphoric acid (HBDMBP) or diisodecylphosphoric acid (DIDPA), phosphonic acids, phosphinic acids, thiophosphoric acids, thiophosphonic acids, thiophosphinic acids, thiophosporous acids, sulphonic acids such as dinonylnaphthalenesulphonic acid (HDNNS), hydroxamic acids, substituted 8-hydroxyquinolines, β-diketones and β-hydroxyoximes.

The organic diluent may be chosen from among the polar or aliphatic organic diluents that have been proposed for use in the field of liquid—liquid extraction such as toluene, xylene, t-butylbenzene, triisopropyl-benzene, n-dodecane, hydrogenated tetrapropylene (HTP) or even paraffin.

As for aqueous solutions suited to being used for the selective stripping of the elements E1 and E2 from the organic phase, these are generally acid solutions, in which the acidity may be more or less pronounced, depending on the nature of said elements, and which contain if necessary one or several agents capable of selectively complexing either element(s) E1 or element(s) E2.

By way of examples of said complexing agents, one may cite carboxylic acids, hydroxycarboxylic acids such as oxalic acid and citric acid, polyaminocarboxylic acids such as ethylenediaminetetraacetic acid (EDTA) and hydroxyl-2-ethylenediaminotriacetic acid (HEDTA), phosphoric acids, sulphonic acids, dithiophosphonic acids, amines, hydrophilic polyazines such as polypyridines, β-diketones and β-hydroxyoximes.

In a preferred embodiment of the method according to the invention, the element(s) E1 are chosen from among the group comprising the minor actinides (americium, curium and neptunium), whereas the element(s) E2 are chosen from the group comprising the lanthanides.

In said preferred embodiment, the first extractant is, preferably, a solvating extractant and the elements E1 and E2 are co-extracted from a strongly acid aqueous solution, of pH less than or equal to 1.

This means that, if the aqueous solution from which one wishes to separate the element(s) E1 from the element(s) E2 does not initially have a pH at this level, then it must be acidified, beforehand and/or simultaneously with the co-extraction of said elements, for example by addition of a nitric acid solution of molarity between 2 and 5.

One may also add to said aqueous solution one or several complexing agents, intended to avoid fission products other than the elements E1 and E2, which may also be present in said solution, from being co-extracted with said elements. Said complexing agents may be of the same type as those previously cited.

Preferably, the solvating extractant is a malonamide, in particular DMDBTDMA or DMDOHEMA.

In said same preferred embodiment, the second extractant is advantageously a cation exchange extractant, which is, preferably, a phosphoric acid, in particular, bis-(2-ethylhexyl)phosphoric acid (HDEHP) or bis-(1,3-dimethylbutyl) phosphoric acid (HBDMBP).

The diluent, for its part, is preferably hydrogenated tetrapropylene.

Furthermore, the element(s) E1 are, preferably, stripped from the organic phase by bringing said phase into contact with an aqueous acid solution of pH higher than 1, and containing one or several complexing agents chosen from the group comprising carboxylic acids, hydroxycarboxylic acids, polyaminocarboxylic acids, dithiophosphinic acids, sulphonic acids, amines and hydrophilic polyazines.

The element(s) E2 are, for their part, preferably stripped from the organic phase by bringing said phase into contact with an aqueous nitric acid solution of molarity between 0.1 and 1.

Again in said preferred embodiment, step e) of each cycle comprises the following operations:
  selectively stripping the second extractant from the organic phase, said stripping being, preferably, achieved by aqueous solubilisation of the second extractant by bringing the organic phase at the end of step d) into contact with an aqueous solution of pH higher than 3, containing a strong base and, if necessary, a weak hydrophilic acid;
  purifying the organic phase thus unloaded of the second extractant, said purification being, preferably, achieved by one or several scrubbings of said organic phase by an aqueous solution of a strong base, of pH higher than 8; and
  back-extracting the second extractant in a fraction of the organic phase thus purified, said fraction representing around 5 to 25% by volume of the volume of the organic phase at the end of step d) and said back-extraction being, preferably, achieved by bringing said fraction into contact with an aqueous solution of strong acid of pH lower than or equal to 3, containing said second extractant.

Consequently, when applied to the separation of at least one element E1 chosen from among the minor actinides from at least one element E2 chosen from among the lanthanides, and more particularly to the separation of americium and curium from the lanthanides, the method according to the invention offers two major advantages compared to the methods proposed in the prior art.

Indeed, firstly, it makes it possible to do away with the phenomena of parasite co-extraction of molybdenum, zirconium and iron and, consequently, the necessity of having to subsequently carry out extraction operations intended to achieve the separation of the actinides from these cations, then the elimination of said cations from the organic phase.

Secondly, it makes it possible to avoid a reduction in the extracting power of the solvating extractant and thus increase, for a same volume of aqueous solution treated and a same quantity of solvating extractant used, the levels of actinides and lanthanides extracted from said solution during one cycle.

The method according to the invention therefore provides improved performance, while at the same time being simpler to implement and cheaper.

Other characteristics and advantages of the invention will become clearer from the description that follows, which relates to an embodiment of the invention and to examples that demonstrate its performance and industrial reliability, said examples being given by way of illustration and in no-wise limitative, and by referring to the appended drawings.

DETAILED DESCRIPTION OF THE INVENTION

Figure 1:
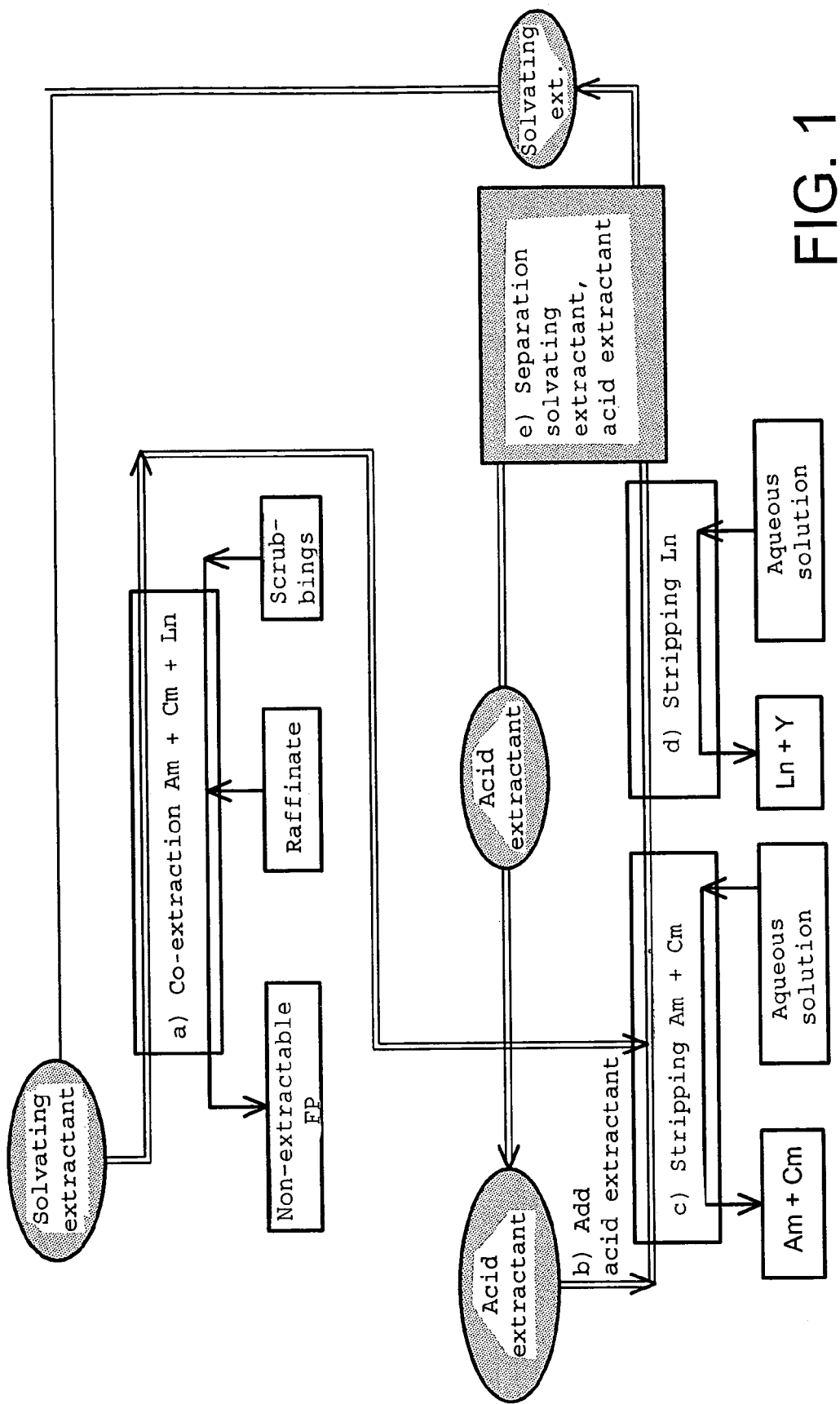
FIG. 1 is a schematic diagram of one cycle of the method according to the invention, in an embodiment designed to separate americium(III) and curium(III) from trivalent lanthanides from a PUREX raffinate.

We will refer firstly to FIG. 1, which schematically illustrates one cycle of the method according to the invention, in an embodiment specially designed to separate americium(III) and curium(III) from trivalent lanthanides from a PUREX raffinate arising from, for example, the dissolution of a spent MOX fuel.

Said raffinate is an aqueous acid solution that contains the quasi-totality of the elements arising from the dissolution of the spent fuel—with the exception of uranium and plutonium—in the form of nitrates.

As can be seen in FIG. 1, one cycle of the method according to the invention comprises 5 steps, respectively a), b), c), d) and e).

The first step, or step a), comprises an operation consisting in co-extracting the americium, curium and lanthanides from the PUREX raffinate.

Said co-extraction is carried out using an organic phase comprising a solvating extractant in solution in an organic diluent, and adding to the raffinate an aqueous concentrated nitric solution, for example of molarity 3, as well as, secondarily, one or several complexing agents intended to avoid the parasitic co-extraction of the other fission products present in the raffinate.

The solvating extractant is, for example, a malonamide such as N,N'-dimethyl-N,N'-dibutyltetradecyl-malonamide (DMBTDMA) or N,N'-dimethyl-N,N'-dioctyl-hexylethoxy-malonamide (DMDOHEMA), at a concentration of 0.65 mol/l, which is capable of extracting americium, curium and the lanthanides from a strong aqueous nitric acid solution, whereas the organic diluent is, for example, hydrogenated tetrapropylene (HTP).

As for the complexing agents, these may be, for example, oxalic acid used at a concentration of 0.1 mol/l and hydroxy-2-ethylenediaminotriacetic acid (HEDTA) used at a concentration of 0.01 mol/l.

Step a) further comprises, at the end of the co-extraction operation, an operation of scrubbing the organic phase, intended to eliminate the undesirable fission products likely to have migrated from the raffinate towards said organic phase despite the presence of the complexing agent or agents in said raffinate.

Thus, the organic phase is, for example, subjected to a first scrubbing by an aqueous solution of concentrated nitric acid, such as a 2.8 mol/l solution of nitric acid, containing oxalic acid (0.2 mol/l) and HEDTA (0.015 mol/l). Then, it is subjected to a second scrubbing by an aqueous solution of nitric acid less concentrated than the previous one, such as a 0.5 mol/l solution of nitric acid.

Step a) thus enables the americium, curium and light lanthanides (in other words, from lanthanum to gadolinium included) and yttrium to be recovered in an organic phase formed of a mixture of solvating extractant/diluent.

The next step, or step b), comprises adding to said organic phase a cation exchange extractant or acid extractant, for example, a phosphoric acid such as a phosphoric acid such as bis-(2-ethylhexyl)phosphoric acid (HDEHP) or bis-(1,3-dimethylbutyl)phosphoric acid (HBDMBP), at a concentration of 0.3 mol/l which, for its part, is suited to extracting the lanthanides from an aqueous nitric acid solution of low acidity and, consequently, to retaining them in the organic phase during step c), which follows step b).

Step c) consists, in fact, in selectively stripping americium and curium from the organic phase using an aqueous solution of low acidity, for example of pH 3, and containing 0.1 mol/l of HEDTA and 0.2 mol/l of citric acid.

Said selective stripping is, in particular, made possible by the presence, in the organic phase, of the acid extractant which makes it possible to retain the lanthanides in said phase while at the same time allowing the transfer of americium and curium into the aqueous solution.

One thus recovers an aqueous solution which contains the americium and curium, and an organic phase containing the lanthanides and yttrium in solution in a mixture of solvating extractant/acid extractant/diluent.

Step d) consists in selectively stripping the lanthanides and yttrium from said organic phase.

Said stripping is, for example, carried out by means of an aqueous solution of nitric acid of molarity 1.

This makes it possible to recover, firstly, an aqueous phase which contains the lanthanides and yttrium and, secondly, an organic phase which contains, apart from the solvating extractant and the acid extractant in solution in the diluent, a certain number of impurities and degradation products, notably from radiolysis, which have accumulated in said phase during the co-extraction and stripping steps.

As can be seen in FIG. 1, step e) corresponds to the step of separating the solvating extractant and the acid extractant with a view to re-using them in the following cycle, for the implementation of steps a) and c) respectively.

Figure 2:
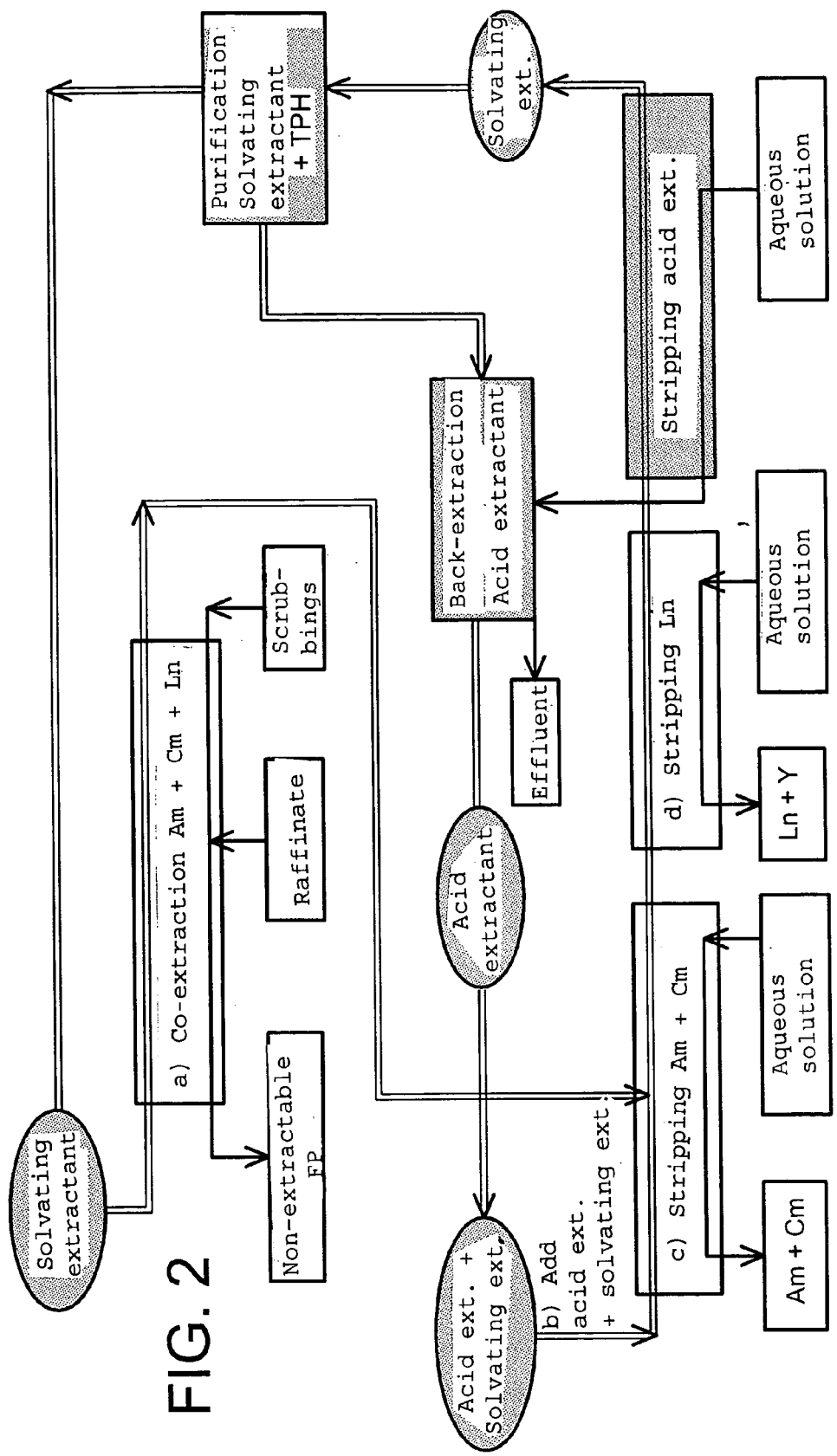
FIG. 2 is a schematic diagram of the cycle shown in FIG. 1, but showing step e) of said cycle in greater detail.

If one now refers to FIG. 2, which shows said step e) in greater detail, this comprises, in the embodiment of the method according to the invention which is shown in this Figure, three successive operations, namely:

an operation of separating, stricto sensu, the solvating extractant and the acid extractant, said separation being achieved by stripping the acid extractant from the organic phase;

an operation of purifying the organic phase thus unloaded of the acid extractant, in order to eliminate from said phase the impurities and the degradation products that it contains; and an operation of back-extracting the acid extractant in a fraction of the thus purified organic phase.

The stripping of the acid extractant from the organic phase is achieved, for example, by solubilising said extractant in an aqueous solution of pH higher than 3, containing a strong base mixed, if necessary, with a weak hydrophilic acid such as, for example, a 0.2 M solution of ammonium carbonate.

The purification of the organic phase comprises, for example, one or several scrubbings by an aqueous solution of a strong base, of pH higher than 8, such as a solution of sodium carbonate or sodium hydroxide (0.1–0.3 mol/l).

As for the back-extraction of the acid extractant, this is, for example, achieved by acidification of the aqueous solution which contains said extractant by means of a highly concentrated solution of nitric acid, for example of molarity 4.7, and bringing said aqueous solution into contact with said fraction.

One thus recovers the organic phase in the form of two fractions:

a first fraction, which represents around 75 to 95% by volume of the volume of the organic phase at the end of step d) and which uniquely comprises the solvating extractant in solution in HTP, and a second fraction, which represents around 5 to 25% by volume of the volume of the organic phase at the end of step d) and which contains the acid extractant and a small quantity of solvating extractant in solution in HTP.

The first fraction is ready to be re-used for carrying out step a) of the following cycle, whereas the second fraction is ready to be added, in step b) of the following cycle, to the organic phase from step a) for carrying out step c).

The following examples describe experiments carried out in the laboratory and which made it possible to check the suitability of the method according to the invention to eliminate the parasitic co-extraction of undesirable chemical elements and to avoid a reduction in the extracting power of the first extractant, as well as its feasibility on a pilot scale.

EXAMPLE 1

Elimination of the Parasitic Co-extraction of Undesirable Elements

The suitability of the method according to the invention in eliminating the phenomena of parasitic co-extraction of undesirable chemical elements while separating minor actinides and lanthanides was highlighted by tests aimed at treating two aqueous solutions, referred to hereafter as S1 and S2 and containing molybdenum, zirconium and 3 to 4 mol/l of nitric acid (which corresponds to the nitric acidity of a PUREX raffinate), with:

firstly, an organic phase, hereafter called P1, which comprises 0.65 M DMDOHEMA and 0.6 M of HBDMBP in HTP, and secondly, an organic phase, hereafter called P2, which only contains 0.65 M DMDOHEMA in HTP.

The initial compositions of the solutions S1 and S2 are shown in Table 1 below.

TABLE 1

| | Solutions | |
|---|---|---|
| | S1 | S2 |
| $HNO_3$ (mol/l) | 3.35 | 3.85 |
| Oxalic acid (mol/l) | 0.1 | 0.1 |
| Mo (mg/l) | 192 | 191 |
| Zr (mg/l) | 197 | 196 |

The solutions S1 and S2 and the organic phases P1 and P2 brought into contact in parallel, two by two and volume by volume, for 10 minutes at a constant temperature of 22° C.

Then, after decanting and separating the phases, the 4 recovered organic phases were again brought into contact with an aqueous solution of 0.5 M oxalic acid, for 10 minutes at a constant temperature of 22° C., in order to strip the cations ($H^+$, Mo and Zr) present in said organic phases so that they could be assayed by inductively coupled plasma—atomic emission spectrometry (ICP-AES) in an aqueous phase.

The final concentrations of each of said cations in solutions S1 and S2 were also determined.

The results are shown in Table 2 below in which:

the column "S1/P1" corresponds to the results obtained for the solution S1 treated with the organic phase P1, the column "S2/P1" corresponds to the results obtained for the solution S2 treated with the organic phase P1, the column "S1/P2" corresponds to the results obtained for the solution S1 treated with the organic phase P2, the column "S2/P2" corresponds to the results obtained for the solution S2 treated with the organic phase P2, the lines "$H^+_{init}$" and "$H^+_{fin}$" respectively indicate the initial and final concentrations (in mol/l) of $H^+$ cations in solutions S1 and S2, the lines "$Mo_{init}$" and "$Mo_{fin}$" respectively indicate the initial and final concentrations (in mg/l) of Mo cations in solutions S1 and S2, whereas the line "$Mo_{org}$" indicates the final concentrations (in mg/l) of molybdenum cations in organic phases P1 and P2, the line "D(Mo)" indicates the distribution coefficients of molybdenum, in other words the ratios between the final concentrations of molybdenum cations in organic phases P1 and P2 and the final concentrations of said same cations in solutions S1 and S2, the line "Balance(Mo)" indicates the ratios between the sum ($Mo_{fin}+Mo_{org}$) and $Mo_{init}$, expressed as percentages, the lines "$Zr_{init}$" and "$Zr_{fin}$" respectively indicate the initial and final concentrations (in mg/l) of zirconium cations in solutions S1 and S2, whereas the line "$Zr_{org}$" indicates the final concentrations (in mg/l) of zirconium cations in organic phases P1 and P2, the line "D(Zr)" indicates the distribution coefficients of zirconium, in other words the ratios between the final concentrations of zirconium cations in organic phases P1 and P2 and the final concentrations of said same cations in solutions S1 and S2, whereas the line "Balance(Zr)" indicates the ratios between the sum ($Zr_{fin}+Zr_{org}$) and $Zr_{init}$, expressed as percentages.

TABLE 2

| | S1/P1 | S2/P1 | S1/P2 | S2/P2 |
|---|---|---|---|---|
| $H^+_{init}$ (mol/l) | 3.35 | 3.85 | 3.35 | 3.85 |
| $H^+_{fin}$ (mol/l) | 3.06 | 3.45 | 3.05 | 3.47 |
| $Mo_{init}$ (mg/l) | 192 | 191 | 192 | 191 |
| $Mo_{fin}$ (mg/l) | 42.5 | 25.9 | 182 | 167 |
| $Mo_{org}$ (mg/l) | 150 | 154 | 18 | 31 |
| D(Mo) | 3.5 | 5.9 | 0.10 | 0.18 |
| Balance(Mo) (%) | 100 | 94 | 104 | 104 |
| $Zr_{init}$ (mg/l) | 197 | 196 | 197 | 196 |
| $Zr_{fin}$ (mg/l) | 5.0 | 4.8 | 203 | 197 |
| $Zr_{org}$ (mg/l) | 199 | 187 | 4.4 | 10 |
| D(Zr) | 39 | 39 | 0.02 | 0.05 |
| Balance(Zr) (%) | 104 | 98 | 105 | 106 |

These results show that, when the solutions S1 and S2 are treated with the organic phase P2 only containing DMDOHEMA, the distribution coefficients of molybdenum and zirconium are respectively less than 0.2 and 0.1, which signifies that these chemical elements are weakly extracted by the DMDOHEMA used alone, and this is so even in the absence of any complexing agent in said aqueous solutions.

On the other hand, adding HBDMBP to the organic phase (organic phase P1) strongly increases the extraction of said chemical elements and, in particular, that of zirconium since the distribution coefficient of said zirconium attains the value of 39, which, in the context of a separation of minor actinides and lanthanides, considerably complicates the method and makes it more ponderous by imposing additional extraction operations intended to separate said elements from the actinides with which they are co-extracted, then eliminating them from the organic phase.

Said operations are no longer necessary thanks to the method according to the invention.

EXAMPLE 2

Extracting Power of the Solvating Extractant

In the context of separating minor actinides from lanthanides, the reduction in the solvating power of the solvating extractant when said extractant is used in a mixture with the acid extractant, was highlighted by tests that aimed to treat an aqueous solution, hereafter called S3, containing traces of nitrates of americium ($^{241}$Am: 707 MEq/l) and europium ($^{152}$Eu: 188 MBq/l) as well as 4 mol/l of nitric acid, with:

firstly, an organic phase P1 of identical composition to the organic phase P1 used in example 1, and secondly, an organic phase P2 of identical composition to the organic phase P2 used in example 1.

To do this, the solution S3 was brought into contact with the organic phases P1 and P2 in parallel, volume by volume, for 10 minutes at a constant temperature of 20° C.

After decanting and separating the phases, the activities of americium and europium were determined by gamma spectrometry in each of the phases, thus enabling their distribution coefficients to be determined.

The results are shown in Table 3 below, in which:

the column "S3/P1" corresponds to the results obtained for the solution S3 treated with the organic phase P1, whereas the column "S3/P2" corresponds to the results obtained for the solution S3 treated with the organic phase P2, the lines "$^{241}Am_{init}$" and "$^{241}Am_{fin}$" respectively indicate the initial and final concentrations (in MBq/l) of americium in the solution S3, whereas the line "$^{241}Am_{org}$" indicates the final activity (in MBq/l) of said element in organic phases P1 and P2, the line "D($^{241}$Am)" indicates the distribution coefficients of americium, the line "Balance($^{241}$Am)" indicates the ratios between the sum ($^{241}Am_{fin}+^{241}Am_{org}$) and $^{241}Am_{init}$, expressed as percentages, the lines "$^{152}Eu_{init}$" and "$^{152}Eu_{fin}$" indicate the initial and final concentrations (in MBq/l) of europium in the solution S3, whereas the line "$^{152}Eu_{org}$" indicates the final activity (in MBq/l) of said element in organic phases P1 and P2, the line "D($^{152}$Eu)" indicates the distribution coefficients of europium, whereas the line "Balance($^{152}$Eu)" indicates the ratios between the sum ($^{152}Eu_{fin}+^{152}Eu_{org}$) and $^{152}Eu_{init}$, expressed as percentages.

TABLE 3

|  | S3/P1 | S3/P2 |
|---|---|---|
| $^{241}Am_{init}$ (MBq/l) | 707 | 707 |
| $^{241}Am_{fin}$ (MBq/l) | 144 | 72 |
| $^{241}Am_{org}$ (MBq/l) | 586 | 669 |
| D($^{241}$Am) | 4.1 | 9.3 |
| Balance$^{241}$Am (%) | 103 | 105 |
| $^{152}Eu_{init}$ (MBq/l) | 188 | 188 |
| $^{152}Eu_{fin}$ (MBq/l) | 80 | 30 |
| $^{152}EU_{org}$ (MBq/l) | 136 | 167 |
| D($^{152}$Eu) | 1.7 | 5.5 |
| Balance$^{152}$Eu (%) | 114 | 105 |

These results show that, when the solution S3 is treated with the organic phase P1 containing a mixture of DMDOHEMA/HBDMBP, the distribution coefficients of americium and europium are two to three times less than those obtained when the same solution is treated with organic phase P2 only containing DMDOHEMA.

This indicates the existence of an antagonism between the two extractants which is reflected in a considerable reduction in the extracting power of the DMDOHEMA and which can be avoided by the method according to the invention.

EXAMPLE 3

Validation of the Feasibility of the Method According to the Invention on a Pilot Scale The feasibility, on a pilot scale, of a method according to the invention comprising a step e) as represented in FIG. 2, in other words comprising the stripping of the acid extractant from the organic phase, then its back-extraction in a fraction of said phase after purification of said phase, was validated by experiments, carried out in the laboratory, by means of miniature centrifuge extractors that make it possible to simulate the implementation of a method on a practical scale.

These experiments were carried out by:
stripping HBDMBP from a first organic phase, hereafter called P4, and initially comprising a mixture of 0.63 M DMDOHEMA and 0.32 M HBDMBP in solution in HTP, and by
back-extracting the HBDMBP in a second organic phase, hereafter called P5, and initially comprising 0.68 M DMDOHEMA in solution in HTP.

The stripping of HBDMBP from the organic phase P4 were carried out by means of an aqueous solution of 0.2 M ammonium carbonate, of pH initially equal to 8.84, whereas the back-extraction of HBDMBP in the organic phase P5 was carried out after acidification of said aqueous solution by addition of 4.7 mol/l of nitric acid.

The stripping and back-extraction of the HBDMBP was carried out in two centrifuge extractors arranged in series under the following operating conditions:

rotational speed of the extractors: 4000 rpm, input rate of the organic phases: 60 ml/h for the organic phase P4 and 30 ml/h for the organic phase P5, ammonium carbonate injection rate: 60 ml/h, nitric acid injection rate: 6 ml/h.

After operating for 29 minutes, corresponding to the time required to obtain the equilibrium of the system, samples were taken from the outflows of the organic phases. Said samples were diluted in a mixture of ethanol and water (50/50 by volume) and their respective DMDOHEMA and HHBDMDP concentrations determined by potentiometric assaying with 0.1 M ammonium hydroxide.

The output rates of the organic phases were also determined: they were respectively 50 ml/h for the organic phase P4 and 40 ml/h for the organic phase P5. These output rates are different to the input rates of said phases due to the transfer of HBDMBP from one phase to another.

Table 4 below shows the initial and final concentrations (in mol/l) of the organic phases P4 and P5 in DMDOHEMA and HBDMBP. The values expressed as percentages correspond to the ratios between the quantity of DMDOHEMA and HBDMBP remaining in the output in the organic phases P4 and P5 and the quantity of said same extractant injected in input in the organic phase P4.

TABLE 4

|  | Organic phases | |
|---|---|---|
|  | P4 | P5 |
| DMDOHEMA$_{init}$ (mol/l) | 0.63 | 0.68 |
| HBDMBP$_{init}$ (mol/l) | 0.32 | — |
| DMDOHEMA$_{fin}$ (mol/l) | 0.66 | 0.64 |
| (mol/l) % | 87 | 14 |
| HBDMBP$_{fin}$ (mol/l) | 0.006 | 0.51 |
| (mol/l) % | 1.6 | 105 |

These results show that more than 98% of the HBDMBP is stripped, in a single step, from the organic phase P4 by the aqueous solution of 0.2 M ammonium carbonate. More than 99% of it (detection limit of the measurement apparatus) is then back-extracted in the organic phase P5.

It will be observed that around 14% of the DMDOHEMA follows the HBDMBP under these conditions. This is not a problem, since the principal objective is to recover, at the end of the stripping of HBDMBP, an organic phase only containing DMDOHEMA in HTP. However, this is indeed what is obtained.

Moreover, in so far as the method according to the invention provides for, in the embodiment shown in FIG. 2, back-extracting the acid extractant in a fraction of the organic phase which contains the solvating extractant, the fact that a small quantity of solvating extractant is jointly stripped with the acid extractant does not perturb the system in any way.

BIBLIOGRAPHY

[1] P. Baron et al., *Proceedings of the International Conference on Back-End of the Fuel Cycle: From Research to Solutions*, GLOBAL'01, Paris, France, Sep. 9–13 2001, INIS-FR-1108.

[2] P. S. Dhami et al., *Separation Science & Technology*, 36(2), 325–335, 2001.

The invention claimed is:

1. A cyclic method for separating at least one chemical element E1 from at least one chemical element E2 present in an aqueous solution, each cycle of said method comprising successively:
    contacting said aqueous solution with an organic phase containing a first extractant in an organic diluent, wherein the first extractant coextracts E1 and E2 from the aqueous solution, and then separating the organic phase containing E1 and E2 from the aqueous solution;
    adding a second extractant to the organic phase containing E1 and E2, wherein the second extractant is one that will selectively retain E2 in the organic phase during the following stripping step;
    contacting the organic phase containing E1 and E2 with a first aqueous phase, wherein the first aqueous phase strips E1 from the organic phase, and then separating said first aqueous phase containing E1 from the organic phase;
    contacting the organic phase from which E1 has been stripped with a second aqueous phase, wherein said second aqueous phase strips E2 from the organic phase, and then separating said second aqueous phase containing E2 from the organic phase; and
    separating the first and second extractants from each other and using said extractants in a subsequent cycle.

2. The method according to claim 1, in which the first and second extractants are separated from each other by aqueous solubilisation of one of said extractants.

3. The method according to claim 1, in which the first and second extractants are separated from each other by distillation of one of said extractants.

4. The method according to claim 1, in which the first and second extractants are separated from each other by cryogenic solidification of one of said extractants.

5. The method according to claim 1, in which the first and second extractants are separated from each other by demixing the organic phase into a first organic sub-phase which contains the first extractant, and a second organic sub-phase which is non-miscible with the first organic sub-phase and which contains the second extractant.

6. The method according to claim 1, in which the first and second extractants are separated from each other by an operation consisting of removing the second extractant from the organic phase while maintaining the first extractant in said phase.

7. The method according to claim 6, in which the first and second extractants are separated from each other by aqueous solubilisation, distillation or cryogenic solidification of the second extractant.

8. The method according to claim 6, in which the organic phase is subjected, after removing the second extractant, to a purification treatment.

9. The method according to claim 8, in which the second extractant is back-extracted in a fraction of the organic phase purified by bringing said fraction into contact with an aqueous solution of said second extractant.

10. The method according to claim 1, in which the first and second extractants are chosen from the group comprising solvating extractants, anion exchange extractants and cation exchange extractants.

11. The method according to claim 1, in which the first or second extractant is chosen from the group comprising tri-n-butylphosphate, malonamides, trialkylphosphine oxides, carbamoylphosphine oxides, tri-isobutylphosphine sulphides, carbamoylphosphonates, substituted pyridines and 2,2'-dibenzimidazoles.

12. The method according to claim 1, in which the first or second extractant is chosen from the group comprising quaternary ammoniums, secondary amines, tertiary amines and trialkyl guanidines.

13. The method according to claim 1, in which the first or second extractant is chosen from the group comprising carboxylic acids, phosphoric acids, phosphonic acids, phosphinic acids, thiophosphoric acids, thiophosphonic acids, thiophosphinic acids, thiophosporous acids, sulphonic acids, hydroxamic acids, substituted 8-hydroxyquinolines, R-diketones and R-5 hydroxyoximes.

14. The method according to claim 1, in which the element(s) E1 are chosen from the group comprising the minor actinides, whereas the element(s) E2 are chosen from the group comprising the lanthanides.

15. The method according to claim 14, in which the elements E1 and E2 are co-extracted from an aqueous solution having a pH at the most equal to 1 and the first extractant is a solvating extractant.

16. The method according to claim 15, in which the solvating extractant is a malonamide, in particular dimethyldibutyltetradecyl malonamide (DMDBTDMA) or dimethyldioctylhexylethoxymalonamide (DMDOHEMA).

17. The method according to claim 15 or claim 16, in which the second extractant is a cation exchange extractant.

18. The method according to claim 17, in which the cation exchange extractant is a phosphoric acid, in particular bis-(2-ethylhexyl)phosphoric acid (HDEHP) or bis-(1,3-dimethylbutyl)phosphoric acid (HBDMBP).

19. The method according to claim 14, in which the element(s) E1 are stripped from the organic phase by bringing said organic phase into contact with an aqueous acid solution, of pH higher than 1, and containing one or several complexing agents chosen from among the group comprising carboxylic acids, hydroxy-carboxylic acids, polyaminocarboxylic acids, dithiophosphonic acids, sulphonic acids, amines and hydrophilic polyazines.

20. The method according to claim 14, in which the element(s) E2 are stripped from the organic phase by bringing said organic phase into contact with an aqueous solution of nitric acid of molarity between 0.1 and 1.

21. The method according to claim 14, in which step e) of each cycle comprises the following operations:
    selectively stripping the second extractant from the organic phase;
    purifying the organic phase thus unloaded of the second extractant; and
    back-extracting the second extractant in a fraction of the organic phase thus purified, said fraction representing around 5 to 25% by volume of the volume of the organic phase at the end of step d).

22. The method according to claim 21, in which the second extractant is stripped from the organic phase by bringing said organic phase into contact with an aqueous solution, of pH higher than 3, containing a strong base and, if necessary, a weak hydrophilic acid.

23. The method according to claim 21, in which the organic phase is purified by bringing it into contact with an aqueous solution of a strong base, of pH higher 10 than 8.

24. The method according to claim 21, in which the second extractant is back-extracted in the fraction of organic phase by bringing said fraction into contact with an aqueous acid solution, of pH less than or equal to 3.

25. The method according to claim 14, comprising separating americium and curium from lanthanides.

* * * * *